United States Patent [19]
Atallah et al.

[11] Patent Number: 5,519,842
[45] Date of Patent: May 21, 1996

[54] METHOD AND APPARATUS FOR PERFORMING UNALIGNED LITTLE ENDIAN AND BIG ENDIAN DATA ACCESSES IN A PROCESSING SYSTEM

[75] Inventors: Deif N. Atallah; Yan Xu, both of Chandler, Ariz.

[73] Assignee: Intel Corporation, Santa Clara, Calif.

[21] Appl. No.: 23,560

[22] Filed: Feb. 26, 1993

[51] Int. Cl.⁶ .............................. G06F 12/04; G06F 13/00
[52] U.S. Cl. ...................... 395/412; 395/411; 395/474; 395/480; 364/246.3; 364/931.46; 364/966.4; 364/DIG. 1
[58] Field of Search ........................ 395/411, 474, 395/480, 412; 364/246.3, 931.46, 966.4

[56] References Cited

U.S. PATENT DOCUMENTS

| | | | |
|---|---|---|---|
| 4,959,779 | 9/1990 | Weber et al. | 395/775 |
| 5,107,415 | 4/1992 | Sato et al. | 395/800 |
| 5,132,898 | 7/1992 | Sakamura et al. | 395/425 |
| 5,243,699 | 9/1993 | Nickolls et al. | 395/275 |
| 5,265,259 | 11/1993 | Satou et al. | 395/800 |
| 5,398,328 | 3/1995 | Weber et al. | 395/500 |

OTHER PUBLICATIONS

Douglas Boiling, "Bringing it All Together: A Look Inside the 486 Chip", Nov. 13, 1990, PC Magazine, V9, N19, pp. 463–464, 476, and 481–483.

i960™ CA Microprocessor Users Manual, Intel Corporation, 1992, pp. 10–4–10–10.

Primary Examiner—Tod R. Swann
Assistant Examiner—Frank J. Asta
Attorney, Agent, or Firm—Blakely, Sokoloff, Taylor & Zafman

[57] ABSTRACT

A system which is able to perform unaligned big endian and little endian accesses to memory with little or no added overhead to the system. In the preferred embodiment, the processor operates in little endian data format. The memory, however, can store data in big endian and little endian format in different memory regions. If an unaligned access is to be performed, the access requires translation to corresponding aligned memory accesses. However, if the processor operates in little endian format and accesses are to memory which store according big endian format, special code is required to perform proper translation of accesses. When the address generation unit of the processor detects an unaligned memory access, an unaligned signal is set which causes a microassist to initiate a microflow to execute microcode which performs the necessary translations for unaligned accesses. The address generation unit also sends the address to be access to the memory region table which maintains information regarding each memory region, including whether the region is big endian or little endian. The state bit indicative of the data format is logically combined with the unaligned access signal to generate an output which sets the state of the flag. The flag is then accessed by the microcode to determine the translation routine to process the memory access.

12 Claims, 5 Drawing Sheets

METHOD AND APPARATUS FOR PERFORMING UNALIGNED LITTLE ENDIAN AND BIG ENDIAN DATA ACCESSES IN A PROCESSING SYSTEM

BACKGROUND OF THE INVENTION

1. Field of the invention

The present invention relates to unaligned accesses to data. More particularly, the present invention relates to unaligned accesses to data addressed in little endian and big endian format.

2. Art Background

Byte ordering determines how data is read from or written to memory and buses and ultimately how data is stored in the memory. The two byte ordering types are referred to as little endian and big endian. Little endian systems store words in which the least significant byte is at the lowest address in memory. For example, a little endian ordered word is stored at address 600. The least significant byte is stored at address 600 and the most significant byte at address 603. Big endian systems store the least significant byte at the highest byte address in memory. Therefore, if a big endian ordered word consisting of four bytes is stored at address 600, the least significant byte is stored at address 603 and the most significant byte at address 600.

Another factor to consider when addressing memory to access is whether the address is aligned or unaligned. Aligned data requests provide an address that occurs on a data type's natural boundary. Quad words and triple words are lined on 16 byte boundaries, double words on 8 byte boundaries, words on 4 byte boundaries, short words (half-words) on 2 byte boundaries, and bytes on 1 byte boundaries. Unaligned requests do not occur on these natural boundaries.

Any aligned request to a memory region is executed without modification of the access request. When the processor encounters an unaligned request, microcode breaks the unaligned request into a series of aligned requests. For example, if a read request is issued to read a little endian word from address XXXXXXX1H (unaligned), the request is executed as a byte request followed by a short request followed by a byte request. FIG. 1 illustrates how aligned and unaligned bus transfers may be carried out for memory regions that use little endian ordering.

Typically, a processor will operate in either a little endian or big endian mode and the bus attached to the processor operates in the same mode. Although some processors can operate either in the big endian mode or little endian mode, most processors typically operate in one mode and perform a translation of data received from an output to memory or other external devices prior to input to the processor. For example, processors manufactured by Intel Corporation use little endian format internally. Therefore, the processor performs operations in little endian format and likewise the internal bus which connects the processor is also little endian. Translations are performed prior to the input to the processor, for example at the bus controller, so that the addressing information is in the proper format prior to receipt by the processor.

Although translation of addresses from big endian to little endian is not immediately cumbersome, a translation of formats in conjunction with unaligned data transfers can be quite complex. Processors which support both little endian and big endian modes are able to maintain relative simplicity in translation of the data from unaligned to aligned requests. However, for processors that operate in one mode and perform translations from the second mode, the system incurs a significant cost and/or performance penalty if both modes are accepted. Many systems simply do not support unaligned accesses in the alternate data format. If a system is able to support both data format modes, the second mode is supported by causing an exception or fault and initiating specialized software to address the alignment translation for each mode. However, this significantly adds to processing overhead. Alternately, it is conceivable that specially designed hardware may be developed to handle both aligned and unaligned accesses in both modes. Such an approach however, is quite expensive due to the amount of hardware that would be required.

SUMMARY OF THE INVENTION

The present system provides for data accesses in unaligned and aligned big endian and little endian formats. The processor itself operates in a first format, for example, little endian format. Therefore, aligned and unaligned accesses generated by the processor and input through the bus and bus controller are fairly straight forward. However, accesses in a second format, for example, big endian accesses, particularly unaligned big endian accesses, are quite difficult. In the present invention a hardware flag and microcode are used to branch to different microflows to handle either case of unaligned little endian accesses or unaligned big endian accesses in a timely manner. This method provides this capability with little increase in processor overhead or construction cost.

BRIEF DESCRIPTION OF THE DRAWINGS

The objects, features and advantages of the present invention will become apparent to one skilled in the art in view of the following detailed description in which.

DETAILED DESCRIPTION OF THE INVENTION

In the following description for purposes of explanation, numerous details are set forth in order to provide a thorough understanding of the present invention. However, it will be apparent to one skilled in the art that these specific details are not required in order to practice the present invention. In other instances well known electrical structures and circuits are shown in block diagram form in order not to obscure the present invention unnecessarily.

Figure 1:
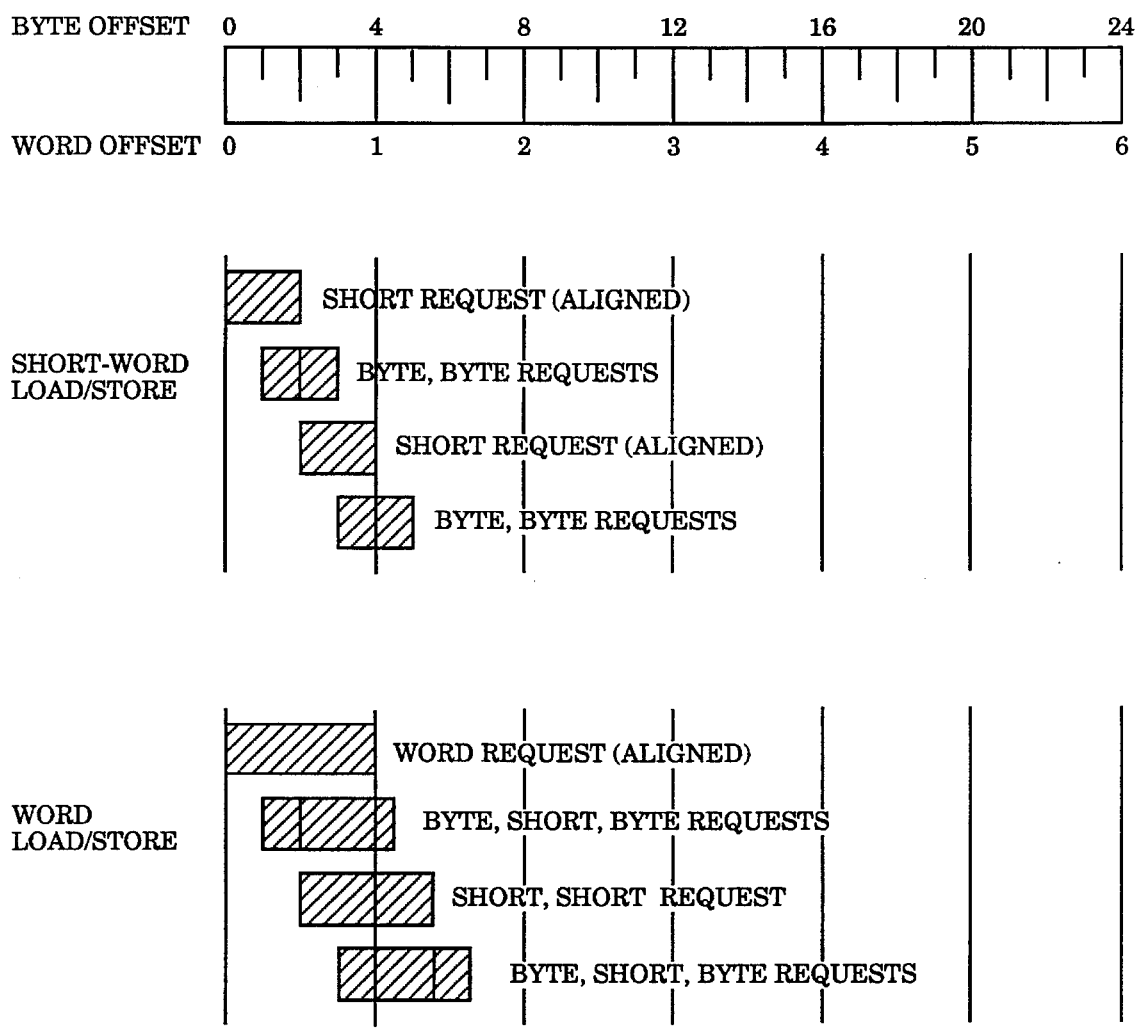
FIG. 1 illustrates an exemplary unaligned accesses and their corresponding sequence of aligned data accesses.
Figure 2:
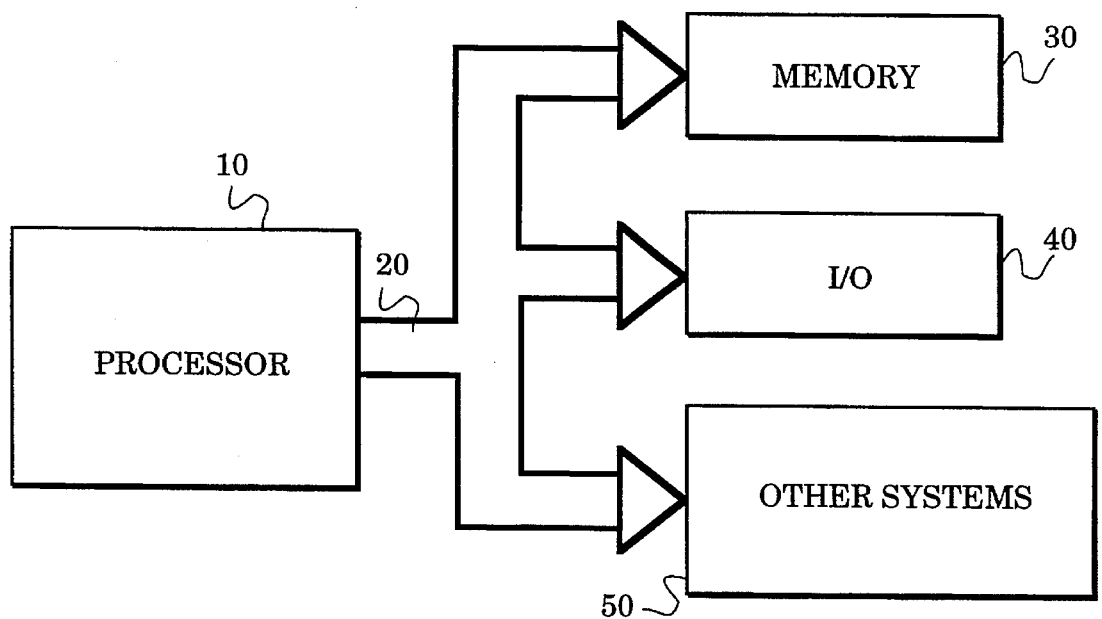
FIG. 2 illustrates an exemplary system of the present invention.

An exemplary system which performs unaligned address translations of addresses in big endian and little endian format is shown in FIG. 2. The system includes a processor 10, which operates in a first format, for example, little endian format, and at least one peripheral device such as memory 30, I/O 40 and other buses and systems 50 connected via bus 20. In particular, the memory has the capability to store data in either big endian or little endian format.

When a request to perform a memory access is generated, the processor will determine whether the access is to data in big endian or little endian format, whether the access is aligned or unaligned, and will perform the necessary translations if unaligned.

Figure 3:
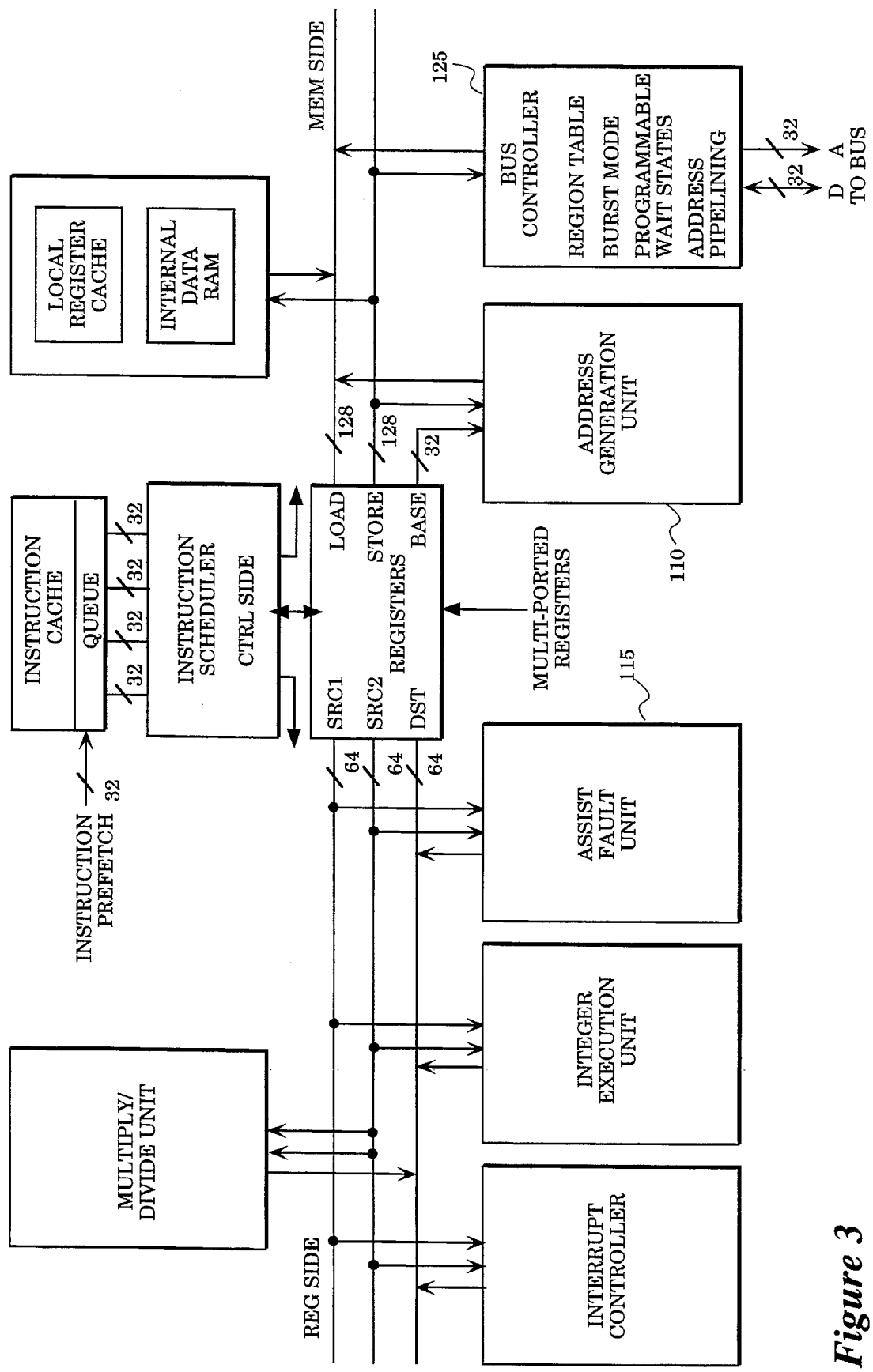
FIG. 3 illustrates one embodiment of the processor of the present invention.

More particularly, referring to FIG. 3, the address generation unit (AGU) 110 detects an unaligned access. When an unaligned access is detected, the AGU 110 first stalls subsequent instructions from executing. For example, in a i960™ CA processor, this is accomplished by scoreboarding the machine (see i960™ CA Microprocessor Users Manual, Intel Corporation 1992), pp. A- 11-A12). The microflow executes a microcode routine to determine if the access is big endian or little endian and to perform the necessary translation. In the present embodiment, a signal is issued to the assist fault unit (AFU) 115 which creates an unaligned assist which causes the processor to branch to UBE/ULE (unaligned big endian/unaligned little endian) microcode routines. An assist is an internal mechanism which provides for microcode assistance for certain conditions which cannot be handled by the hardware.

In the preferred embodiment, the processor operates in little endian format. Therefore, in order to perform big endian unaligned accesses, these accesses will have to be determined. In order to simply and easily determine big endian unaligned accesses without incurring unnecessary hardware or processor performance overhead, a hardware flag mechanism which immediately detects unaligned big endian accesses is utilized. An exemplary mechanism is illustrated in FIG. 4.

Figure 4:
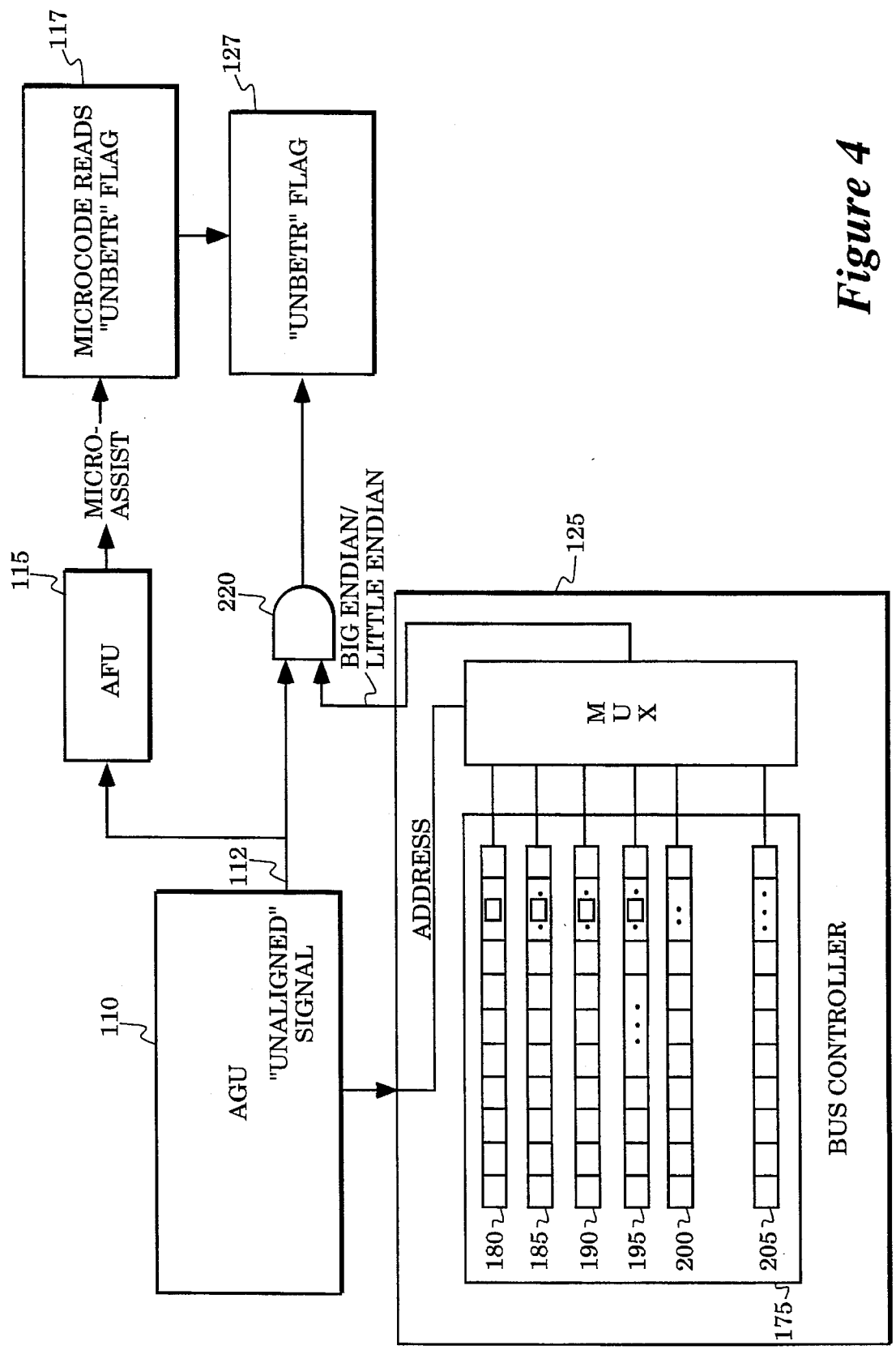
FIG. 4 illustrates the generation of the hardware flag in one embodiment of the present invention.

Referring to FIG. 4, the bus controller 125 contains a memory region table 175 which typically comprises a series of registers containing various state bits relative to each region. For example, if the memory is divided into 16 regions there are 16 different entries in the table which identify the state and characteristics of a particular region. One of the state bits in each entry of the table, 180, 185, 190, 195, 200, 205, is a bit designated to identify if the section of memory is addressed in big endian or little endian format. Memory region tables are found in processors, such as the i960® CA/CF manufactured by Intel Corporation. When an access is to be performed, the AGU 110 causes the entry for the particular region of memory to be output from the memory region table 175. The state bit which identifies whether the memory region is big endian or little endian is input to a logic gate 220 which logically ANDs the unaligned signal 112 generated by the AGU 110. If the AGU detects an unaligned access to a region which the region table 175 identifies as a big endian access, a predetermined bit in the processor, herein referred to as the UNBETR flag 127 (Unaligned Access Big Endian True) is set.

Therefore, as the microcode routines for unaligned accesses is accessed and executed, the value of the UNBETR flag is determined and is available for reference by the microcode to establish if code to perform a little endian or big endian unaligned access is to be used. The UNBETR flag may be reset by a mechanism 117 initiated by the instruction of a subsequent memory access. However, preferably the UNBETR flag 127 comprises a latch which latches the output of logic gate 220.

When an unalign access is detected and a microassist is generated to branch to the microcode, the microcode first causes the alias register to be loaded by reading the unaligned register in the AGU 110 and further, saves the effective address generated by the AGU 110. The unaligned register contains the instruction (its opcode and operands) causing the unaligned access. The alias register holds the macro-flow instruction (user's code) while microcode is running. It provides the microcode a window into the operands of the macro-flow instruction. The effective address may also be accessed by the fault processing code if the processor is required to fault on an unaligned access. The dedicated hardware flag UNBETR is tested to determine if the processor branches to UBE or ULE code. If the flag is set, the UBE code is executed. As described above, this flag is coupled to the output of the unaligned accesses detect logic and the big endian/little endian bits of the memory region configuration registers in the region table located in the bus controller 125. As the external memory can be configured as a mixture of little endian and big endian memory subsystems by setting or clearing the corresponding state bit in the memory region configuration register of the region table, the present invention enables unaligned big endian and unaligned little endian accesses to be correctly and quickly handled by the processor.

In the present embodiment, it is preferred that the UBE/ULE routines are written in microcode which is accessed by the microflow of the system (see i960 CA Microprocessor Users Manual for information regarding the microflow). The microflow, based upon the type of unaligned access, performs routines that are slightly different in nature but both of which adjust the byte ordering of the data from big endian to little endian or visa versa, increments the effective address and source destination address, reissues multiple aligned accesses to the bus control unit 125 to load/store from/to the required address to/from the appropriate registers and checks to see if the processor is requested to fault on unaligned access or not. If so, the code branches to the fault microcode for continued processing.

Figure 5:
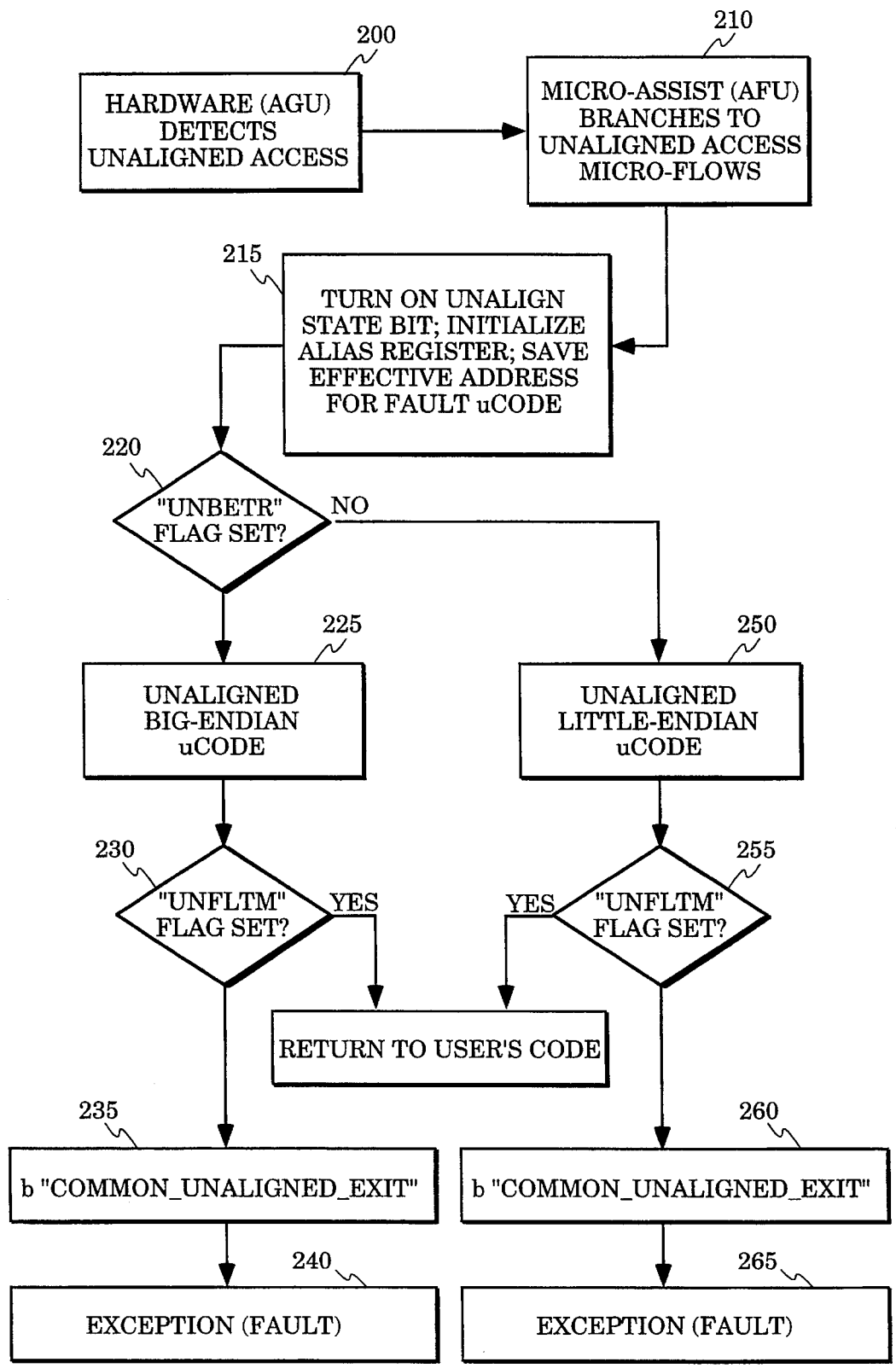
FIG. 5 is a flowchart which illustrates the process implemented in the system of the present invention.

The process flow in general is shown in FIG. 5. At step 200, the AGU detects an unaligned access. At step 210, the micro-assist located in the AFU, branches to unaligned access microflows. At step 215, the unaligned state bit is turned on, the alias register is initialized and the effective address is saved for the microcode. It is then determined whether the UNBETR flag is set 220. If it is set, then the processor branches to the unaligned big endian microcode step 225. At step 230, if the UNFLTM flag is set, control branches back to the user's code. Otherwise, there is a branch to the common_unaligned_exit, step 235, and an exception is issued 240. The routine "common_unaligned_exit" sets some parameters required by unaligned fault microcode, then branches to fault microcode and the fault handler exception. If the UNBETR flag is not set, at step 250 the unaligned little endian microcode is executed to perform unaligned little endian accesses. Similarly at step 250, if the UNFLTM flag is set, control returns to the user's code. Otherwise at steps 260 and 265, a branch to common_unaligned_exit occurs and an exception is issued.

The invention has been described in conjunction with the preferred embodiment. It is evident that numerous alternatives, modifications, variations and uses will be apparent to those skilled in the art in light of the forgoing description.

What is claimed is:

1. A processing system comprising a main processor and at least one peripheral device coupled to the main processor by a bus, said main processor processing data in a first data order, said peripheral device comprising memory, said memory divided up into regions according to addresses, said system maintaining a memory region table, each entry in the table providing identifying characteristics regarding a region of memory including whether the data is addressed in a first data order or a second data order, said processing system further comprising:

means for detecting a memory access in unalignment with a data boundary of memory and issuing an unaligned access signal;

means for accessing a state bit in the memory region table indicative of the data order of the region of memory to be accessed;

means for setting a flag to a value if the unaligned access signal is issued and the state bit accessed indicates that the region is addressed in the second data order;

means for executing an unaligned service routine upon issuance of the unaligned access signal, said unaligned service routine checking the state of the flag to determine whether the access is to be performed as an unaligned access of a first data order or an unaligned access of a second data order;

wherein the detection of the an unaligned access of a second data order is available to the unaligned access service routine.

2. The processing system as set forth in claim 1, wherein the means for detecting a memory access comprises an address generation unit.

3. The processing system as set forth in claim 1, wherein the means for accessing a state bit comprises an address generation unit which issues a memory address of the access to the memory region table.

4. The processing system as set forth in claim 1, wherein the means for setting a flag comprises a logical AND means which receives as input the state bit and the unaligned access signal.

5. The processing system as set forth in claim 1, wherein said means for executing an unaligned service routine comprises a microassist which initiates microcode to be executed to perform unaligned accesses.

6. The processing system as set forth in claim 4, wherein the output of the logical AND means is latched to retain the value of the flag.

7. A processing system comprising a main processor and at least one peripheral device coupled to the main processor by a bus, said main processor processing data in little endian data format, said peripheral device comprising memory, said memory divided up into regions according to addresses, said system maintaining a memory region table, each entry in the table providing identifying characteristics regarding a region of memory including whether the data is addressed in little endian data format or big endian data format, said processing system further comprising:

an address generation unit for detecting a memory access which is unaligned with data boundaries of memory and issuing an unaligned access signal, said address generation unit further issuing the address of the memory access to the memory region table;

said memory region table outputting the entry for the address of memory received;

logic means for combining a data format state bit indicative of the entry output from the memory region table and the unaligned access signal such that if the data format state bit indicates that the data is accessed in big endian format and the unaligned access signal has been issued, a signal denoting this case is set;

logic coupled to receive the signal output from the logic means to store a value in a flag; and means for executing code in the processor upon issuance of the unaligned access signal, said code checking the value of the flag to determine whether unaligned big endian access or unaligned little endian access is to be performed;

wherein the detection of the an unaligned big endian access is available to the code.

8. The processing system as set forth in claim 7, wherein the logic means comprises a logical AND gate.

9. The processing system as set forth in claim 7, wherein the code comprises microcode and the means for executing code comprises microflow.

10. In a processing system comprising a main processor and at least one peripheral device coupled to the main processor by a bus, said main processor processing data in a first data order, said peripheral device comprising memory, said memory divided up into regions according to addresses, said system maintaining a memory region table, each entry in the memory region table providing identifying characteristics regarding a region of memory including whether the data is addressed in a first data order or second data order, a method for performing unaligned accesses to memory addressed in a first data order and a second data order, comprising the steps of:

detecting a memory access in unaligned with a data boundary of memory;

issuing an unaligned access signal;

accessing a state bit in the memory region table indicative of the data order of the region of memory to be accessed;

setting a flag if the unaligned access signal is issued and the state bit accessed indicates that the region is addressed in the second data order;

executing an unaligned service routine upon issuance of the unaligned access signal, said unaligned service routine checking the state of the flag to determine whether the access is to be performed as an unaligned access of a first data order or an unaligned access of a second data order;

wherein the detection of the an unaligned access of a second data order is available to the unaligned access service routine.

11. The method as set forth in claim 10, wherein the step of setting the flag comprises the step of logically combining the unaligned access signal and the state bit, and storing the output of the logical combining of signals as the flag.

12. The method as set forth in claim 11 wherein the step of storing the output of the logical combining of signals comprises latching the output of the logical combining of signals.

* * * * *